United States Patent
Jensen et al.

(10) Patent No.: US 11,364,914 B2
(45) Date of Patent: Jun. 21, 2022

(54) HYDROSTATIC TRANSMISSION PRESSURE MONITORING SYSTEMS AND WORK VEHICLES CONTAINING THE SAME

(71) Applicant: Deere & Company, Moline, IL (US)

(72) Inventors: Ross E. Jensen, Waterloo, IA (US); David G. Reid, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 159 days.

(21) Appl. No.: 16/935,915

(22) Filed: Jul. 22, 2020

(65) Prior Publication Data

US 2022/0024455 A1 Jan. 27, 2022

(51) Int. Cl.
*B60W 30/188* (2012.01)
*B60W 10/06* (2006.01)
*B60W 10/103* (2012.01)
*F16H 61/4008* (2010.01)
*B60K 25/02* (2006.01)

(52) U.S. Cl.
CPC .......... *B60W 30/188* (2013.01); *B60K 25/02* (2013.01); *B60W 10/06* (2013.01); *B60W 10/103* (2013.01); *F16H 61/4008* (2013.01); *B60K 2025/026* (2013.01); *B60W 2300/152* (2013.01); *B60W 2510/105* (2013.01); *B60W 2510/1085* (2013.01); *B60W 2710/0677* (2013.01); *B60W 2710/1088* (2013.01)

(58) Field of Classification Search
CPC .. B60W 10/06; B60W 10/103; B60W 30/188; B60W 2300/152; B60W 2510/105; B60W 2510/1085; B60W 2710/0677; B60W 2710/1088; B60K 25/02; B60K 2025/026; F16H 61/4008
See application file for complete search history.

(56) References Cited

U.S. PATENT DOCUMENTS 9,046,160 B2 * 6/2015 Hoff .................. F16D 25/12
2009/0143952 A1 * 6/2009 Chisholm ............. F16H 61/475
701/99
2015/0120148 A1 * 4/2015 Henson .............. B60W 30/1886
701/48

FOREIGN PATENT DOCUMENTS

DE 102006000784 A1 8/2006
DE 102013221241 A1 5/2014

OTHER PUBLICATIONS

German Search Report issued in Germany Patent Application No. 102021115735.8, dated Jan. 3, 2022, 5 pages.

* cited by examiner

*Primary Examiner* — Edwin A Young
(74) *Attorney, Agent, or Firm* — Klintworth & Rozenblat IP LLP

(57) ABSTRACT

A hydrostatic transmission pressure monitoring system includes a hydrostatic transmission and a pressure sensor data source. The hydrostatic transmission includes, in turn, a transmission casing, a pivoting yoke assembly rotatably mounted in the transmission casing, a hydrostatic pump-motor arrangement containing a hydraulic pump-motor circuit at least partially formed in the pivoting yoke assembly, and a pressure scaling device fluidly coupled to the hydraulic pump-motor circuit. The pressure scaling device is configured to generate a pressure-scaled output signal substantially proportional to a peak circuit pressure within the hydraulic pump-motor circuit. The pressure sensor data source is fluidly coupled to the pressure scaling device and is configured to generate pressure sensor data indicative of the pressure-scaled output signal.

20 Claims, 7 Drawing Sheets

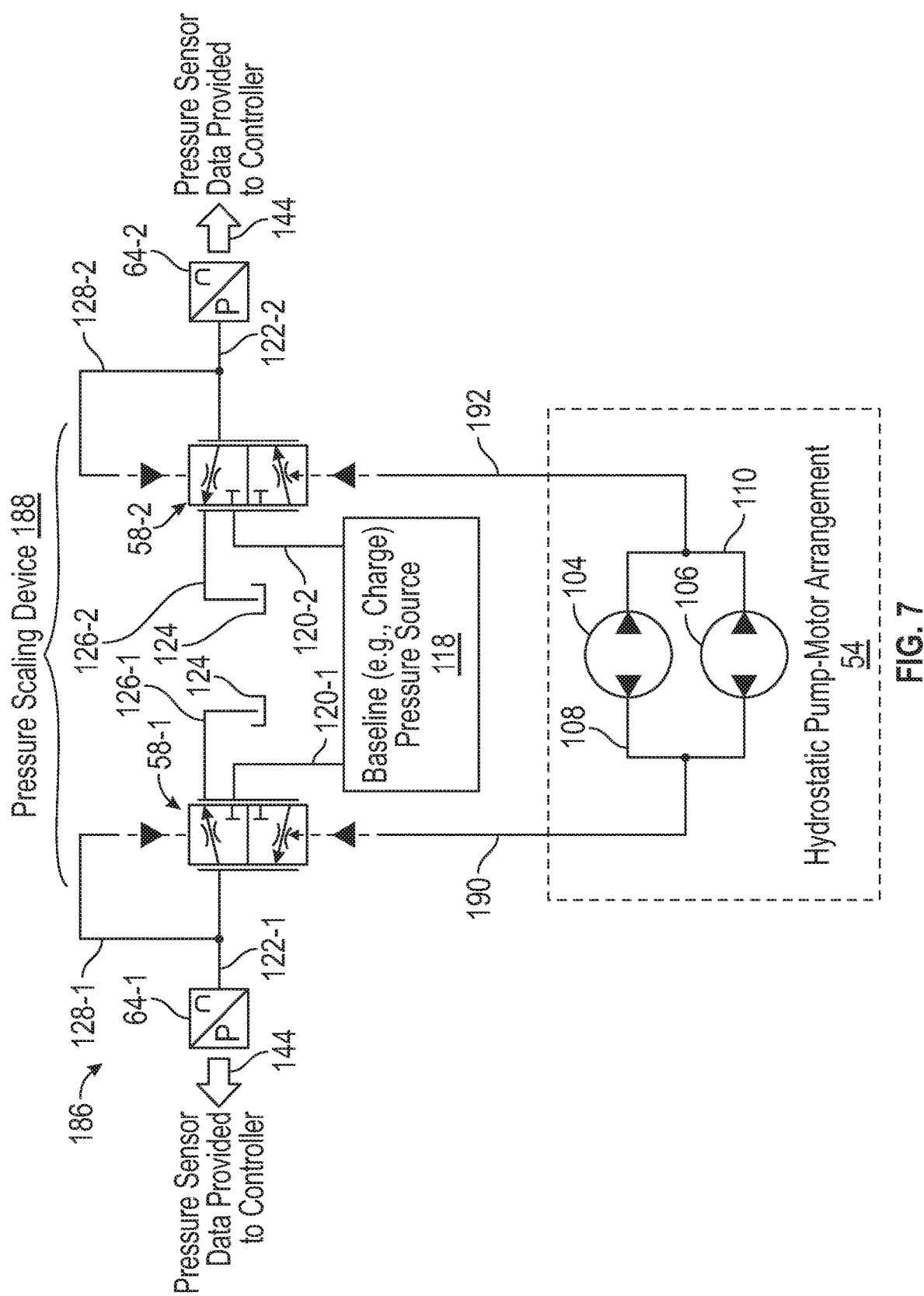

HYDROSTATIC TRANSMISSION PRESSURE MONITORING SYSTEMS AND WORK VEHICLES CONTAINING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to hydrostatic transmission pressure monitoring systems and to work vehicles containing such pressure monitoring systems.

BACKGROUND OF THE DISCLOSURE

A hydrostatic infinitely variable transmission (IVT) contains a variable displacement pump-motor arrangement, which can be controlled to vary the input-output (I/O) speed ratio of the IVT. By common design, such a pump-motor arrangement contains a pair of reciprocating axial piston devices, which are fluidly interconnected by a hydraulic circuit. When the IVT is driven in a particular direction, one of the reciprocating axial piston devices operates as a pump, while the other axial piston device functions as a motor. By varying the swash angles of the axial piston devices, the torque and speed output of the IVT can be controlled over a continuous range encompassing a zero value with a relatively high degree of precision. These characteristics render hydrostatic IVTs well-suited for integration into work vehicles, which often contain engines placed under highly variable torque loads at lower ground speeds. In certain instances, a hydrostatic IVT may further incorporate a multi-modal (e.g., planetary) gear train, which enables on-the-fly selection between multiple gear ratios. In this case, the hydrostatic IVT may be more specifically referred to as a "hydromechanical IVT" and may utilize the hydrostatic pump-motor arrangement to provide the desired continuous output speed variability, while leveraging the multi-modal gearing to enhance IVT efficiency by minimizing power transfer losses. Certain hydromechanical IVTs further incorporate a power-splitting design to, for example, apportion torque output between a first IVT output shaft driving work vehicle propulsion and a second IVT output shaft utilized to supply mechanical power to other driven components onboard the work vehicle or contained in an interchangeable implement attached to the work vehicle.

SUMMARY OF THE DISCLOSURE

Embodiments of a hydrostatic transmission pressure monitoring system include a hydrostatic transmission and a pressure sensor data source. The hydrostatic transmission includes, in turn, a transmission casing, a pivoting yoke assembly rotatably mounted in the transmission casing, a hydrostatic pump-motor arrangement containing a hydraulic pump-motor circuit at least partially formed in the pivoting yoke assembly, and a pressure scaling device fluidly coupled to the hydraulic pump-motor circuit. The pressure scaling device is configured to generate a pressure-scaled output signal substantially proportional to a peak circuit pressure within the hydraulic pump-motor circuit. The pressure sensor data source is fluidly coupled to the pressure scaling device and is further configured to generate pressure sensor data indicative of the pressure-scaled output signal.

In further embodiments, the hydrostatic transmission pressure monitoring system includes a hydrostatic pump-motor arrangement having a hydraulic pump-motor circuit, a pressure scaling valve (PSV), a pressure sensor, and a controller in signal communication with the pressure sensor. The PSV has a PSV sense port at which a peak circuit pressure of the hydraulic pump-motor circuit is received when hydrostatic pump-motor arrangement is driven in at least a first direction, as well as a signal outlet at which a pressure-scaled output signal generated. The pressure-scaled output signal is substantially proportional to the peak circuit pressure. The pressure sensor is in fluid communication with the signal outlet and is configured to generate pressure sensor data indicative of the pressure-scaled output signal, while the controller is configured to monitor the peak circuit pressure within the hydraulic pump-motor circuit utilizing the pressure sensor data.

Embodiments of a work vehicle equipped with a hydrostatic infinitely variable transmission (IVT) are further provided. In an embodiment, the work vehicle includes a controller in addition to the hydrostatic IVT. The hydrostatic IVT includes, in turn, a hydrostatic pump-motor arrangement having a hydraulic pump-motor circuit, a PSV, and a pressure sensor. The PSV has a PSV sense port at which a peak circuit pressure from the hydraulic pump-motor circuit is received, a baseline pressure inlet at which a baseline input pressure is received, and a signal outlet at which a pressure-scaled output signal generated. The pressure sensor is in fluid communication with the signal outlet and is configured to generate pressure sensor data indicative of the pressure-scaled output signal. The controller is configured to estimate the peak pressure within the hydraulic pump-motor circuit utilizing on the pressure sensor data received by the controller during operation of the hydrostatic IVT.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 7 is a flow schematic of a hydrostatic transmission pressure monitoring system similar to that shown in FIG. 4, while including a pair of PSVs serving as the pressure scaling device and a corresponding pair of pressure sensors serving as the pressure sensor data source, as illustrated in accordance with a further example embodiment.

Figure 1:
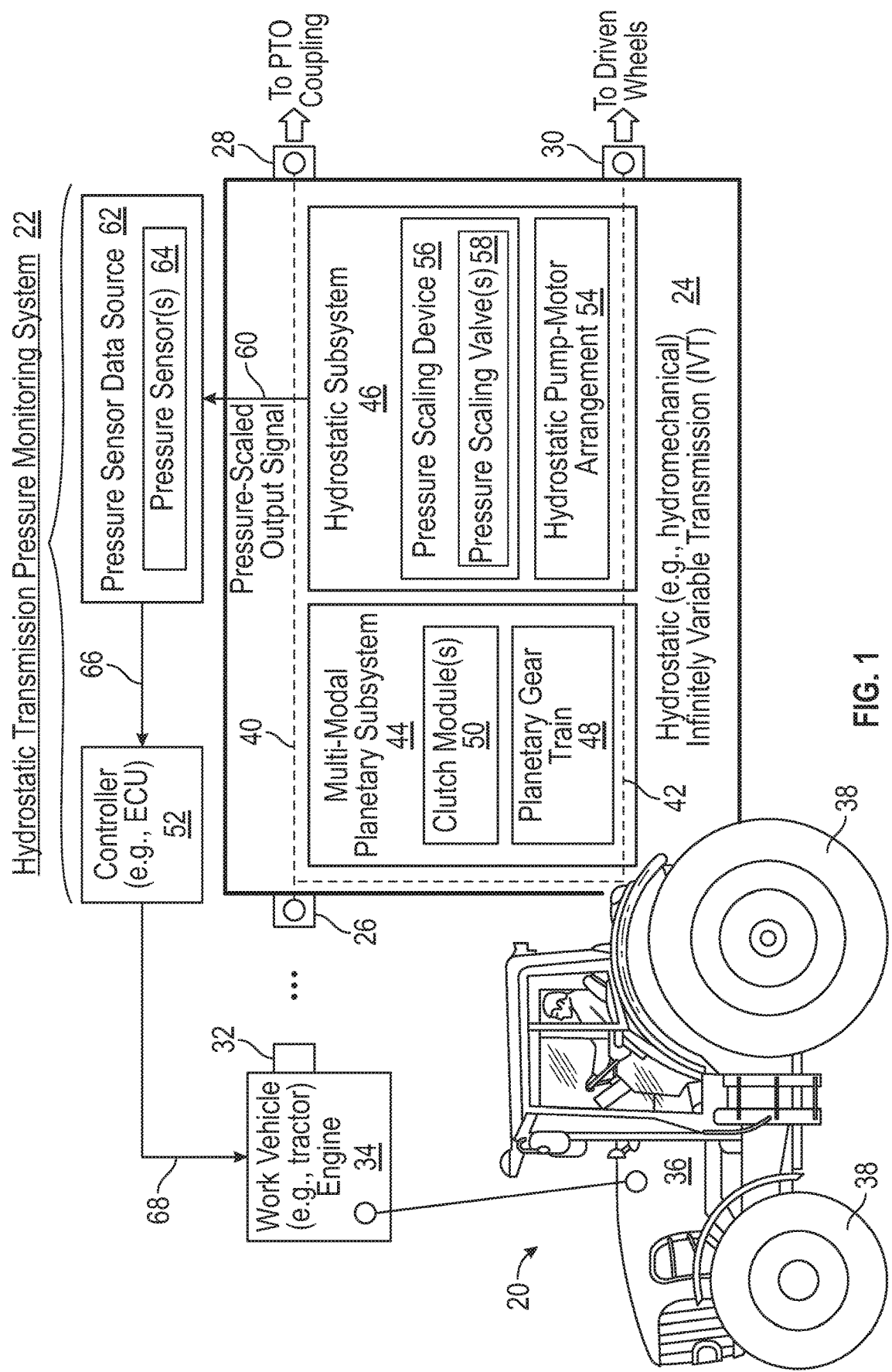
FIG. 1 is a schematic of a work vehicle (here, a tractor) equipped with a hydrostatic transmission pressure monitoring system including a hydromechanical infinitely variable transmission (IVT), which contains a pressure scaling device in the form of one or more pressure scaling valves (PSVs), as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed above, certain work vehicles are equipped with hydrostatic infinitely variable transmissions (IVTs) having power-splitting designs and incorporating multi-modal (e.g., planetary) gear train subsystems. Such power-splitting hydromechanical IVTs are well-suited for deployment onboard work vehicles to provide continuously variable transmission ratios, high power transfer efficiencies, and other benefits. When integrated into a tractor, for example, a hydromechanical IVT may provide a first torque transfer path extending through the IVT and the hydrostatic pump-motor arrangement; and a second torque transfer path extending through the IVT, while bypassing the hydrostatic pump-motor arrangement. The first torque transfer path may mechanically link the tractor engine to the driven wheels of the tractor and other variable loads, thereby enabling the hydrostatic pump-motor arrangement to provide a continuously-adjustable output speed over a rotational speed range optimized for tractor propulsion. Comparatively, the second torque transfer path may mechanically link the tractor engine to a power takeoff (PTO) shaft of the tractor; that is, a rotating shaft that, when coupled to a mating shaft provided on an interchangeable implement towed by the tractor, transmits a fraction of the rotational power generated by the tractor engine to movable components onboard the implement.

While providing the above-described benefits, power-splitting hydromechanical IVTs (and power-splitting hydrostatic transmissions, generally) encounter certain technical challenges. One such challenge arises when attempting to accurately monitor the torque division or apportionment between the different torque transfer paths through the IVT. Generally, the torque division between the hydraulic torque transfer path (that is, the torque transfer path extending through the hydrostatic pump-motor arrangement) and the non-hydraulic (e.g., PTO) torque transfer path can be determined as follows. First, the hydraulic torque transfer through the hydrostatic pump-motor arrangement may be estimated. The estimated hydraulic torque transfer may then be compared with the current power output of the engine to deduce the current torque transfer through the non-hydraulic (e.g., PTO) torque transfer path. The magnitude of the hydraulic torque transmission through the hydrostatic pump-motor arrangement can also be calculated in a relatively straight-forward manner; e.g., as function of pump displacement, the current peak (or "high side") pressure within the hydraulic pump-motor circuit, and other secondary factors, such as hydrostatic efficiency. Per-rotation pump displacement may, in turn, be estimated by comparing the relative rotational speeds of the pump-motor (axial piston) devices included in the pump-motor arrangement, while compensating for leakage or other hydrostatic inefficiencies. In other instances, hydrostatic pump displacement can be approximated in another manner; e.g., by considering known geometries and measuring the respective swash angles of the axial piston hydraulic devices.

Additional technical challenges may be encountered when attempting to measure the peak or "high side" circuit pressure within the hydraulic pump-motor circuit. Such technical challenges tend to arise when the hydraulic pump-motor circuit is formed within a movable subassembly or "pivoting yoke assembly" contained with a larger, static housing of the transmission referred to herein as the "transmission casing." Additionally, the peak or high side pressures within the hydraulic pump-motor circuit can reach highly elevated levels during transmission operation. For example, in at least some implementations, the peak or high side circuit pressure may reach levels surpassing 700 bar and, perhaps, levels approaching or exceeding 1000 bar. Such conditions render it highly challenging to directly measure the peak circuit pressure within the hydraulic pump-motor circuit in a manner that is accurate, cost effective, and structurally robust for the reasons discussed below.

It may be possible to integrate a specialized pressure sensor having elevated pressure sensing capabilities into the pivoting yoke assembly to locally measure the peak (high side) circuit pressure; however, such specialized pressure sensors tend to be relatively costly and to have inadequate durability for work vehicle (off-road) applications. Further, routing electrical power to and signals from such an integrated pressure sensor typically requires undesirably complex wire routing schemes in which internal wires are submerged in heated oil, while external wires are supported by one or more wiring harnesses affixed to the pivoting yoke assembly. Such issues can be mitigated, to a limited extent, by locating the pressure sensor offboard the pivoting yoke assembly and routing the peak circuit pressure to the remotely-located pressure sensor. Routing such highly elevated peak circuit pressures through a hose (or similar flexible conduit capable of accommodating the swiveling action of the pivoting yoke assembly) to enable a remote sensing architecture poses additional problems, however, such as issues associated with hose leakage and stiffening under such high pressure loads. Further, such a remote sensing approach still typically necessitates the usage of a specialized pressure sensor having high pressure sensing capabilities associated with the limitations mentioned above. In an alternative approach, the peak circuit pressure (or, more accurately, the hydraulic fluid carrying the peak circuit pressure) can be routed through a bearing support of the pivoting yoke assembly and ultimately ported to a sensor external to the pivoting yoke assembly. However, such a routing scheme typically necessitates the usage of a high pressure rotary seal, which tends to be costly and leakage prone. Also, once again, such a solution fails to circumvent the need for specialized pressure sensor having sufficiently elevated pressure sensing capabilities to sample the peak (high side) circuit pressure.

For at least these reasons, a second, more specific technical problem arises in attempting to measure the highly elevated peak or "high side" circuit pressures within the hydraulic pump-motor circuit of a hydromechanical IVT (or other hydrostatic transmission). Embodiments of the hydrostatic transmission pressure monitoring system address this technical problem. Specifically, embodiments of the hydrostatic transmission pressure monitoring system incorporate a unique mechanical pressure scaling device, which includes or assumes the form of one or more pressure scaling valves (PSVs). Such PSVs mechanically sample the peak circuit pressures within a hydraulic pump-motor circuit and convert such elevated pressures to corresponding low pressure fluidic signals. These fluidic signals are referred to herein as "pressure-scaled output signals" and are generated by a given PSV to be substantially proportional to (or otherwise indicative of) the peak circuit pressures occurring within a hydraulic pump-motor circuit at any given point in time. Concurrently, when the pump-motor arrangement is driven in a particular direction and placed under load, the pressure-scaled output signal has a pressure significantly less than the peak circuit pressure; e.g., in embodiments, the pressure-scaled output signal may be scaled downwardly by a factor of ten or more relative to the peak (high side) circuit pressure. Due to its reduced magnitude, the pressure-scaled output signal can be measured utilizing readily available, non-specialized pressure sensors having reduced pressure sensing capabilities. Such "non-specialized" pressure sensors (hereafter, "high durability pressure sensors") may be less costly, more accurate, and/or may possess greater structural durability relative to specialized pressure sensors having high pressure sensing capacities.

Depending upon implementation, one or more high durability pressure sensors may be included in a pressure sensor data source, which is fluidly coupled to the pressure scaling device and operably coupled to a processing subsystem or "controller" further contained in the pressure monitoring system. During IVT operation, the controller utilizes pressure sensor data from the pressure sensor data source to monitor the peak or high side circuit pressure within the hydraulic pump-motor circuit. Further, in implementations, the controller may further utilize the peak circuit pressure to determine other pressure-related parameters, such as an estimated magnitude of the torque currently transmitted through the hydrostatic pump-motor arrangement; or, more broadly, through the hydraulic torque transfer path of the IVT when possessing a torque- or power-splitting design. Moreover, in embodiments in which the hydrostatic transmission pressure monitoring system is deployed onboard a tractor (or similar work vehicle) having a PTO shaft, the controller may repeatedly calculate a current torque transmitted through the hydrostatic pump-motor arrangement based, in part, on the peak circuit pressure; and may selectively vary a power output of the work vehicle engine in response to variations in the current torque transmitted through the hydrostatic pump-motor arrangement relative to an estimated torque transmitted through the PTO shaft. Additionally or alternatively, the controller may provide numerical read-out or graphical display of the current torque level transmitted through the hydrostatic pump-motor arrangement, the current torque level transmitted through the PTO shaft, or other such parameters on a display device located within the cabin or operator station of the work vehicle.

In embodiments in which the hydrostatic transmission pressure monitoring system includes a pivoting yoke assembly, the pressure sensor data source (e.g., including one or more high durability pressure sensors) can be integrated into the pivoting yoke assembly itself or mounted to an exterior surface thereof. In other instances, the pressure sensor data source may be located offboard the pivoting yoke assembly, with the high durability pressure sensor(s) potentially affixed to the transmission casing such that the pivoting yoke assembly rotates relative to the pressure sensor(s) when the swash angles of the axial piston devices are adjusted during transmission operation. Such remote positioning of the pressure sensor data source is facilitated due to the reduced pressure of the pressure-scaled output signal relative to the peak (high side) circuit pressure. In particular, the hydraulic fluid carrying the pressure-scaled output signal can be routed through flexible tubing or other conduits with a decreased risk of leakage and with reduced conduit stiffening due to the reduced hydraulic pressures under transport. Alternatively, the pressure-scaled output signal can be routed to the pressure sensor data source through a bearing interface supporting the pivoting yoke assembly, while utilizing a reduced cost, low pressure rotary seal due to the decreased pressure of the pressure-scaled output signal. As a still further benefit, locating the high durability pressure sensor(s) offboard the pivoting yoke assembly may also ease sensor access and replacement during maintenance procedures. The end result, then, is a hydromechanical IVT or other hydrostatic transmission permitting monitoring of the peak circuit pressure of a hydraulic pump-motor circuit in an accurate, reliable, high durability manner suitable for usage within the harsh environments in which work vehicles often operate.

Additional description of an example hydrostatic transmission pressure monitoring system onboard a work vehicle will now be discussed in connection with FIGS. 1-7. In the below-described example embodiment, the hydrostatic transmission pressure monitoring system contains a hydromechanical IVT having a power- or torque-splitting architecture, which delivers rotational power from a work vehicle engine to driven loads along two torque transmission paths. The following example notwithstanding, the hydrostatic transmission pressure monitoring system can contain various other types of hydrostatic transmissions in further embodiments, including continuous variable transmissions (CVTs) aside from IVTs, IVTs (or CVTs) having disparate power-splitting (or perhaps non-power-splitting) designs, and IVTs having purely hydrostatic (rather than hydromechanical) constructions. Further, the controller of the below-described example hydrostatic transmission pressure monitoring system utilizes the monitored peak hydraulic pressure to additionally track or monitor hydraulic torque transmission through a hydrostatic pump-motor arrangement to, for example, ascertain torque apportionment between a hydraulic torque transfer path and a non-hydraulic (PTO) torque transfer path. Again, the hydrostatic transmission pressure monitoring system need not perform such functions in all embodiments, providing that the monitoring system monitors a peak (high side) circuit pressure within a hydraulic pump-motor circuit utilizing a pressure scaling device including one or more PSVs, as further described below. Finally, while discussed below in the context of a particular type of work vehicle (a tractor), embodiments of the hydrostatic transmission pressure monitoring system may be integrated into various other work vehicles containing a hydrostatic transmission benefiting from improved monitoring of the peak (high side) circuit pressure, whether such work vehicles are employed within the agricultural, construction, forestry, or mining industry, or another industrial context.

Tractor Equipped with an Example Hydrostatic Transmission Pressure Monitoring System Referring to FIG. 1, a tractor 20 is equipped with a hydrostatic transmission (here, IVT) pressure monitoring system 22, as illustrated in accordance with an example embodiment of the present disclosure. In the depicted example, the hydrostatic transmission pressure monitoring system 22 includes a hydromechanical IVT 24 having an input shaft 26, a first output shaft 28, and a second output shaft 30. The input shaft 26 of the hydromechanical IVT 24 is mechanically linked to the output shaft 32 of a tractor engine 34, such as a heavy-duty diesel engine or other internal combustion engine, located in an engine compartment 36 of the tractor 20. Rotation of the engine output shaft 32 drives co-rotation of the IVT input shaft 26, which, in turn, drives rotation of the IVT output shafts 28, 30 when the tractor 20 is propelled in a forward or reverse direction. The first IVT output shaft 28 assumes the form of a power takeoff (PTO) shaft in the illustrated example and is referred to hereafter as the "PTO shaft output 28." When the PTO shaft output 28 is coupled to a non-illustrated PTO-driven implement towed by the tractor 20, such as a baler or a tillage implement, the PTO shaft output 28 may be coupled to a corresponding shaft of the implement via a PTO coupling, with rotation of the PTO shaft output 28 imparting motion to the driven components of the implement. Comparatively, the second IVT output shaft 30 may assume the form of or may be coupled to a driveshaft, which delivers rotating power to all or to a subset of the tractor wheels 38 when driven by the engine 34 through the hydromechanical IVT 24. For example, in an embodiment, the IVT output shaft 30 is a mechanical front-wheel drive (MFWD) shaft through which the front wheels 38 of the tractor 38 are driven. The second IVT output shaft 30 (or the first IVT output shaft 28) may also be utilized to deliver rotating power to other non-depicted variable loads, including various pumps or drives, onboard the tractor 20 in embodiments.

As indicated by dashed lines connecting the various shafts 26, 28, 30 in the schematic of FIG. 1, two torque transfer or transmission paths 40, 42 extend through the hydromechanical IVT 24, exclusively or predominately in parallel. Specifically, a first torque transmission path 40 extends from the IVT input shaft 26, through the hydromechanical IVT 24, and to the PTO shaft output 28. A second torque transmission path 42 extends from the IVT input shaft 26, through the hydromechanical IVT 24, and to the second output shaft 30 of the hydromechanical IVT 24. The first torque transmission path 40 is referred to herein as the "PTO torque transmission path 40" given its connection to the PTO coupling of the tractor 20, while the second torque transmission path 42 is referred to as the "hydraulic torque transmission path 42." The word "hydraulic" in the term "hydraulic torque transmission path 42" denotes that this torque transfer path extends through a hydrostatic pump-motor assembly or arrangement 54 included in the below-described hydrostatic subsystem 46.

In the illustrated example, the hydromechanical IVT 24 contains a multi-modal planetary subsystem 44 and a hydrostatic subsystem 46. Addressing first the multi-modal planetary subsystem 44, the subsystem 44 includes (among other non-illustrated components) a planetary gear train 48 and one or more clutch modules 50. The clutch module(s) 50 can be selectively activated or engaged by the below-described controller 52 (e.g., via transmission of commands to associated actuators, such as valve-actuated pistons) to vary the gear ratio through the planetary gear train 48. For example, in embodiments, activation or engagement of a particular clutch module 50 may alter which gear member (e.g., a sun gear, a ring gear, or a planet-carrier unit) serves as the mechanical input and/or mechanical output of the planetary gear train 48, thereby enabling the selection of two or more discrete gear ratio options for I/O speed and torque speed conversion. This enables the controller 52 to choose an optimal gear ratio best suited for various operational conditions encountered when operating the tractor 20 including, for example, tractor operation at low ground speeds and high torque demands (as commonly encountered when the tractor 20 is utilized to perform certain work tasks), as well as tractor operation at higher ground speeds and lower torque loads (as commonly encountered when the tractor 20 is engaged in transport over public or private roadways). By virtue of this structural arrangement, the hydromechanical IVT 24 is imparted with an enhanced I/O variability between the input shaft 26 and the output shaft 30 exceeding that otherwise achievable solely through the inclusion of the hydrostatic subsystem 46. Further, the overall efficiency of the hydromechanical IVT 24 is boosted due to the reduced power losses provided by the multi-modal planetary subsystem 44 relative to comparable, but purely hydrostatic IVT. These benefits notwithstanding, the hydromechanical IVT 24 may lack such a multi-modal planetary (or other gearing) subsystem 44, or otherwise vary relative to the illustrated example, in further implementations of the hydrostatic transmission pressure monitoring system 22.

The IVT hydrostatic subsystem 46 contains a hydrostatic pump-motor arrangement 54 and a pressure scaling device 56, which is fluidly coupled to a hydraulic circuit contained in the pump-motor arrangement 54. The hydrostatic pump-motor arrangement 54 can include, in turn, any combination of fluidly interconnected hydraulic machines or devices suitable for converting a rotating input power (torque and speed) to a variable rotating output power (torque and speed). In one common design, the hydrostatic pump-motor arrangement 54 contains a first axial piston device, a second axial piston device, and a hydraulic pump-motor circuit fluidly interconnecting the axial piston devices. The hydrostatic pump-motor arrangement 54 may be reversible in embodiments and, therefore, may be capable of being driven in either rotational direction; the term "rotational direction," as appearing in this context, define with respect to the rotational direction of the output shaft of the hydrostatic pump-motor arrangement 54. Each of the axial piston devices may operate as either a pump or motor in certain implementations, depending upon the particular direction in which the hydrostatic pump-motor arrangement 54 is driven at a given juncture in time. The pump-motor arrangement 54 need not be reversible in all implementations, however; thus, in alternative embodiments of the hydrostatic transmission pressure monitoring system 22, and depending upon the particular design of the transmission at issue, the pump-motor arrangement 54 may be driven exclusively in a single direction. Additional description of a hydrostatic pump-motor arrangement suitable for usage as the pump-motor arrangement 54 is provided below in connection with the flow schematic of FIG. 4.

With continued reference to FIG. 1, and as noted above, the hydromechanical IVT further contains a pressure scaling device 56. The pressure scaling device 56 can assume any form suitable for generating a relatively low pressure fluidic signal substantially proportional to or otherwise indicative of the peak or high side circuit pressure within the hydraulic pump-motor circuit when the hydrostatic pump-motor arrangement 54 is driven in a particular direction. This fluidic signal is referred to herein as a "pressure-scaled output signal 60." The term "pressure-scaled," as appearing in the phrase "pressure-scaled output signal" denotes that the pressure of the output signal 60 is substantially proportional to (or otherwise indicative of) the peak circuit pressure within the pump-motor circuit, but is reduced (scaled-downwardly) relative thereto by some factor, perhaps on the order of one or two orders of magnitude. In various embodiments, the pressure scaling device 56 contains at least one pressure scaling valve or "PSV" 58, which provides such a mechanical scaling function; that is, the generation of a reduced, pressure-scaled output signal substantially proportional to the peak (high side) circuit pressure within the hydraulic pump-motor circuit. Additional description of the manners in which the PSV 58 (or PSVs 58) may generate such a pressure-scaled output signal 60 indicative of the peak circuit pressure within a hydraulic pump-motor circuit are discussed below in connection with FIGS. 5-6.

The pressure-scaled output signal 60 is supplied to a pressure sensor data source 62, which is fluidly coupled to the PSV 58 (or PSVs 58) contained in the pressure scaling device 56. The pressure sensor data source 62 includes or assumes the form of at least one pressure sensor 64, which generates pressure sensor data (an electronic signal) for input to the electronic controller 52 further included in the hydrostatic transmission pressure monitoring system 22. Accordingly, in embodiments, the pressure sensor 64 (or the pressure sensors 64) included in the pressure sensor data source 62 may be a transducer for converting the fluidic signal (the pressure-scaled output signal 60) to an electrical (digital or analog) signal suitable for application to the controller 52 via a wired or wireless connection represented by the arrow 66. The data generated by the pressure sensor data source 62 is generally referred to herein as "pressure sensor data" and may also contain additional data in embodiments, such data indicative of a low side pressure further contained in the hydraulic pump-motor circuit in implementations in which the pressure scaling device 56 contains multiple PSVs 58, as further discussed below in connection with FIG. 7.

The term "controller," as appearing throughout this document, is utilized in a non-limiting sense to generally refer to the processing architecture of the hydrostatic transmission pressure monitoring system 22. The controller 52 can encompass or may be associated with any practical number of processors, control computers, computer-readable memories, power supplies, storage devices, interface cards, and other standardized components. Further, the controller 52 of the hydrostatic transmission pressure monitoring system 22 may include or cooperate with any number of firmware and software programs or computer-readable instructions designed to carry-out the various process tasks, calculations, and control/display functions described herein. In one embodiment, the controller 52 includes or assumes the form of an engine control unit (ECU) associated with the tractor engine 34. During operation of the hydrostatic transmission pressure monitoring system 22, the controller 52 receives the pressure sensor data from the pressure sensor(s) 46, which the controller 52 utilizes this data to monitor the peak circuit pressure within the hydraulic pump-motor circuit of the pump-motor arrangement 54 and potentially perform other calculation or monitoring functions, as further discussed below. Additionally or alternatively, the controller 52 may output the current peak or high side circuit pressure (or other pressure-related parameters) to a display device located in the cabin of the tractor 20 for visual presentation to an operator of the tractor as, for example, a numerical readout, a virtual gauge, or other such graphic expressed on the screen of the display device.

As generically indicated by an arrow 68 in FIG. 1, the controller 52 is further operably coupled to any number of actuated devices, which may be controlled to regulate the power output of the tractor engine 34; e.g., actuators (e.g., metering valves) regulating the flow of metered fuel and/or actuators (e.g., throttle valves) regulating airflow provided to the combustion chambers of the tractor engine 34. In embodiments, the controller 52 advantageously schedules or otherwise governs operation of the tractor engine 34 to maximize engine power output, while preventing the power or torque transmitted to any particular component driven through the hydromechanical IVT 24 from exceeding a upper or maximum threshold above which driven components onboard the tractor 20 and PTO-driven implements coupled to the tractor 20 may experience premature wear or potentially damage. As the maximum power capacities of these components or systems driven through the IVT output shafts 28, 30 may be known, the controller 52 can schedule the tractor engine 34 to maximize engine power output if the power apportionment or torque division between the torque transmission paths 40, 42 can be determined. Further, as the power output of the engine 34 may be monitored by the controller 52 during tractor operation, the torque division between the torque transmission paths 40, 42 may be determined by the controller 52 if the torque or power transfer through either of the two torque transmission paths 40, 42 can be estimated. For this or other reasons, it may be desirable to measure the power transfer through the hydrostatic pump-motor arrangement 54 as a function of the displacement of the hydrostatic pump-motor arrangement within the hydrostatic pump-motor arrangement 54 and peak or high side circuit pressure in at least some implementations of the hydrostatic transmission pressure monitoring system 22.

Figure 2:
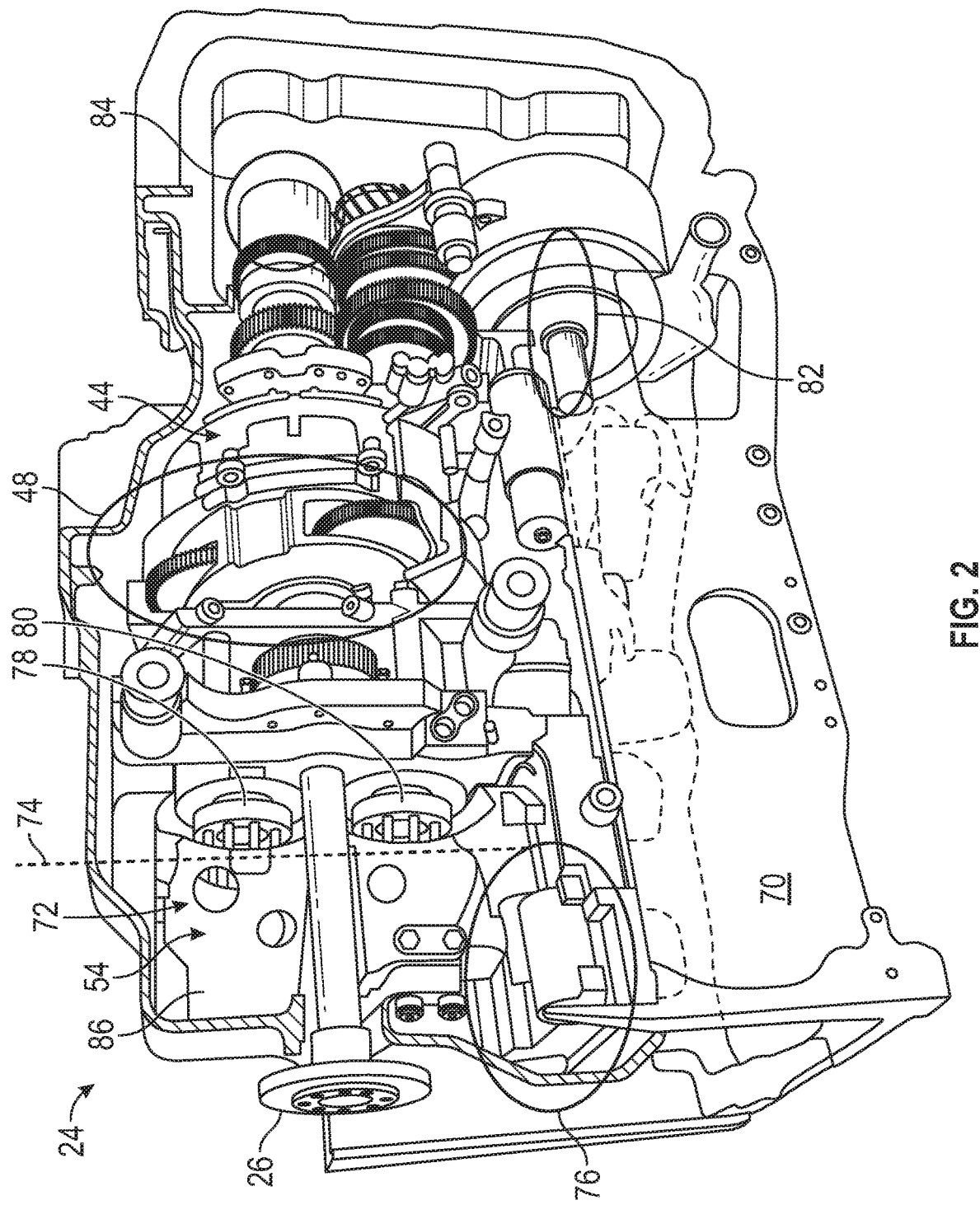
FIG. 2 is a cutaway view of the hydromechanical IVT shown in FIG. 1 in an example implementation of the present disclosure in which the hydromechanical IVT contains a pivoting yoke assembly.

Turning now to FIG. 2, an example implementation of the hydromechanical IVT 24 is shown in cutaway. The hydromechanical IVT 24 includes a main transmission housing or casing 70 in which the above-described hydrostatic pump-motor arrangement 54 is housed. Here, it can be seen that the hydrostatic pump-motor arrangement 54 includes a pivoting yoke assembly 72, which is capable of pivoting or rotating about a pivot axis 74 over a limited angular range (e.g., approximately a 60 degree range in the present example) relative to the static transmission casing 70. The angular positioning of the pivoting yoke assembly 72 may be controlled utilizing one or more hydraulic cylinders, which are generally located within a lower circled region 76 of the hydromechanical IVT 24. Two reciprocating axial piston (pump-motor) devices 78, 80 are partially contained within and interface with the pivoting yoke assembly 72, with the pistons of the axial piston devices 78, 80 sliding within bores provided in the housing 86 (essentially, a pressure-containing flowbody) of the pivoting yoke assembly 72 as the axial piston devices 78, 80 rotate. Rotation of the pivoting yoke assembly 72 varies the respective swash angles of the reciprocating axial piston devices 78, 80, which varies the stroke and per-rotation hydraulic displacement of the axial piston devices 78, 80. This, in turn, varies the I/O speed ratio through the hydrostatic pump-motor arrangement 54, as taken along the hydraulic torque transmission path 42 outlined in FIG. 1. The housing 86 of the pivoting yoke assembly 72 contains the above-mentioned hydraulic pump-motor circuit, which is illustrated and described below in connection with FIG. 4. As also indicated above, the hydrostatic pump-motor arrangement 54 may be reversible such that the arrangement 54 can be driven in either direction, with the peak (high side) pressure within the hydraulic pump-motor circuit switching between different flow loop sides or sections of the hydraulic circuit depending upon the particular manner in which the hydrostatic pump-motor arrangement 54 is driven at a particular juncture in time.

The hydromechanical IVT 24 further contains a multi-modal planetary subsystem 44 including a planetary gear train 48, as previously described above in conjunction with FIG. 1. Generally, the planetary gear train 48 serves to mechanically sum the rotational power (torque and speed) received from the tractor engine 34 via the IVT input shaft 26 and the hydrostatic pump-motor arrangement 54 for application to the lower output shaft 30 of the hydromechanical IVT 24 (FIG. 1), which then supplies rotational power to the tractor wheels 38. The lower output shaft 30 of the hydromechanical IVT 24 is visually obscured in the cutaway view of FIG. 2, but generally extends in a longitudinal direction in a bottom right portion of the transmission casing 70, as denote by a circled region 82. The PTO shaft output 28 (FIG. 1) is likewise hidden from view in FIG. 2, but generally extends within an upper right portion of the main transmission casing 70, as indicated by circled region 84. The hydromechanical IVT 24 further includes various other components, such as a number of non-illustrated clutch modules 50 (FIG. 1), which are not identified for clarity, but which can be selectively engaged and disengaged to transition the hydromechanical IVT 24 through multiple modes of operation depending upon hydraulic the desired ground speed of the tractor 20 and other such factors, as previously described.

Figure 3:
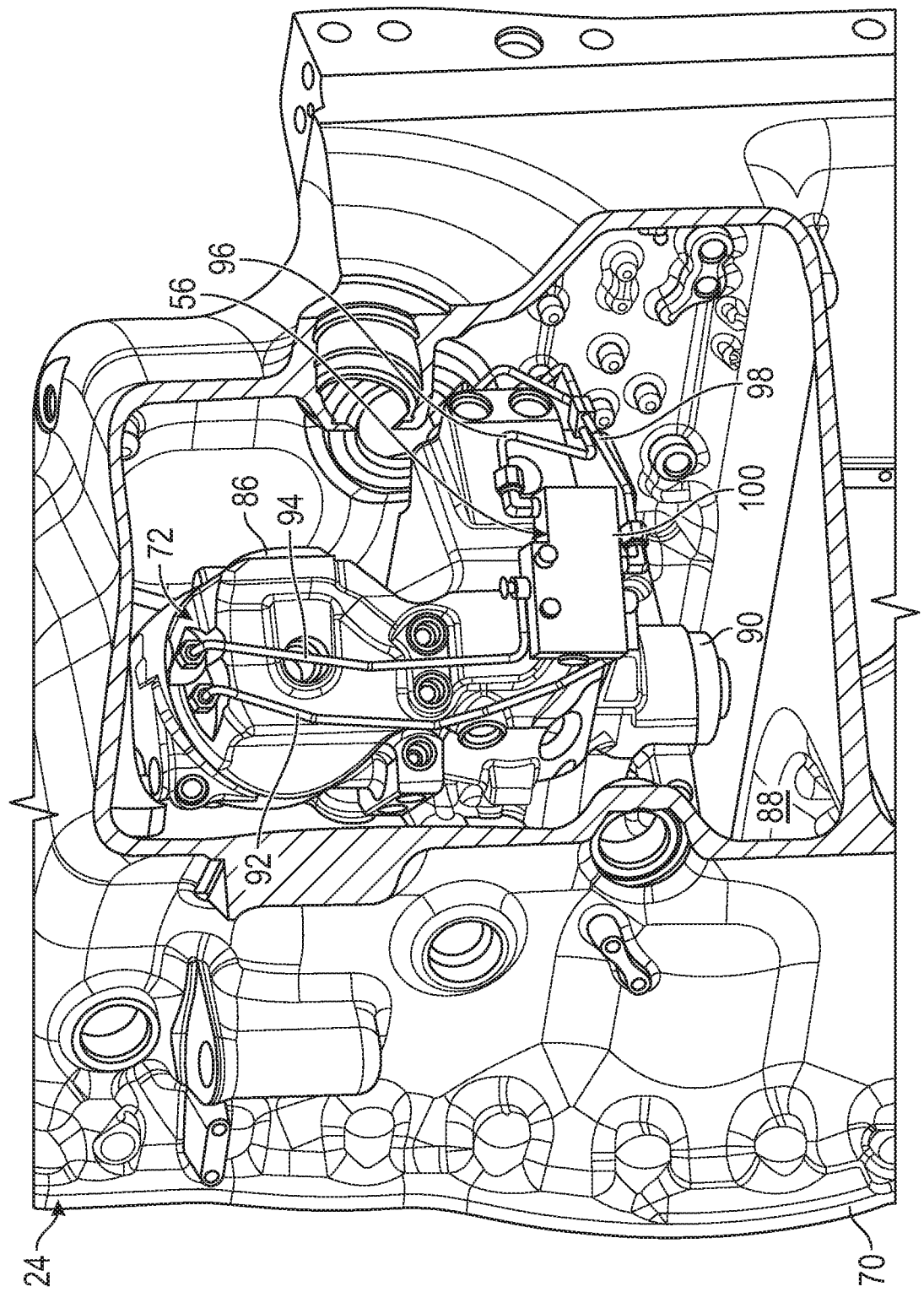
FIG. 3 is a cutaway view of a portion of the example hydromechanical IVT shown in FIG. 2 more clearly depicting the backside of the pivoting yoke assembly to which an example pressure scaling device is mounted.

The backside of the pivoting yoke assembly 72 is depicted more clearly in the cutaway view of FIG. 3. Here, it can be seen that the pivoting yoke assembly 72 includes a pivoting housing 86, which is rotatably or pivotally mounted within a cavity or compartment 88 of the transmission casing 70 via upper and lower bearing mount interfaces 90 (one of which can be seen in a lower portion of FIG. 3). As noted above, the pivoting yoke assembly 72, and specifically the pivoting housing 86 of the yoke assembly 72, is pivoted relative to the transmission casing 70 during operation of the hydromechanical IVT 24 to adjust the swash angles of the axial piston devices 78, 80 (FIG. 2) and thereby vary the I/O ratio through the hydrostatic subsystem 46 (FIG. 1) as desired. Reciprocating action of the axial piston device 78, 80 acting as a pump at a given point in time urges hydraulic flow within the hydraulic pump-motor circuit, which may be formed predominately, if not entirely in the pivoting housing 86 of the pivoting yoke assembly 72. Similarly, the pressure scaling device 56 may be integrated into the pivoting housing 86 in embodiments, with the various fluid interconnections or plumbing features of the PSV or PSVs 58 located internally to the pivoting housing 86. Alternatively, and as shown in FIG. 3, the pressure scaling device 56 may be mounted to an exterior surface of the pivoting housing 86, with the corresponding fluidic connections provided by a number of external flow lines 92, 94, 96, 98. The flow lines 92, 94, 96, 98 conduct pressurized hydraulic fluid at varying pressures between corresponding ports provided in a housing or block 100 of the pressure scaling device 56. In the illustrated example of FIG. 3, the pressure scaling device 56 contains a single PSV 58 and four flow line connections 92, 94, 96, 98. The PSV 58 and the flow line connections 92, 94, 96, 98 are further discussed below in connection with FIG. 6; first, however, the overall functionality of the pressure scaling device 56 is described in conjunction with FIGS. 4 and 5 to provide an illustrative context in which the example pressure scaling device 56 may be better understood.

Figure 4:
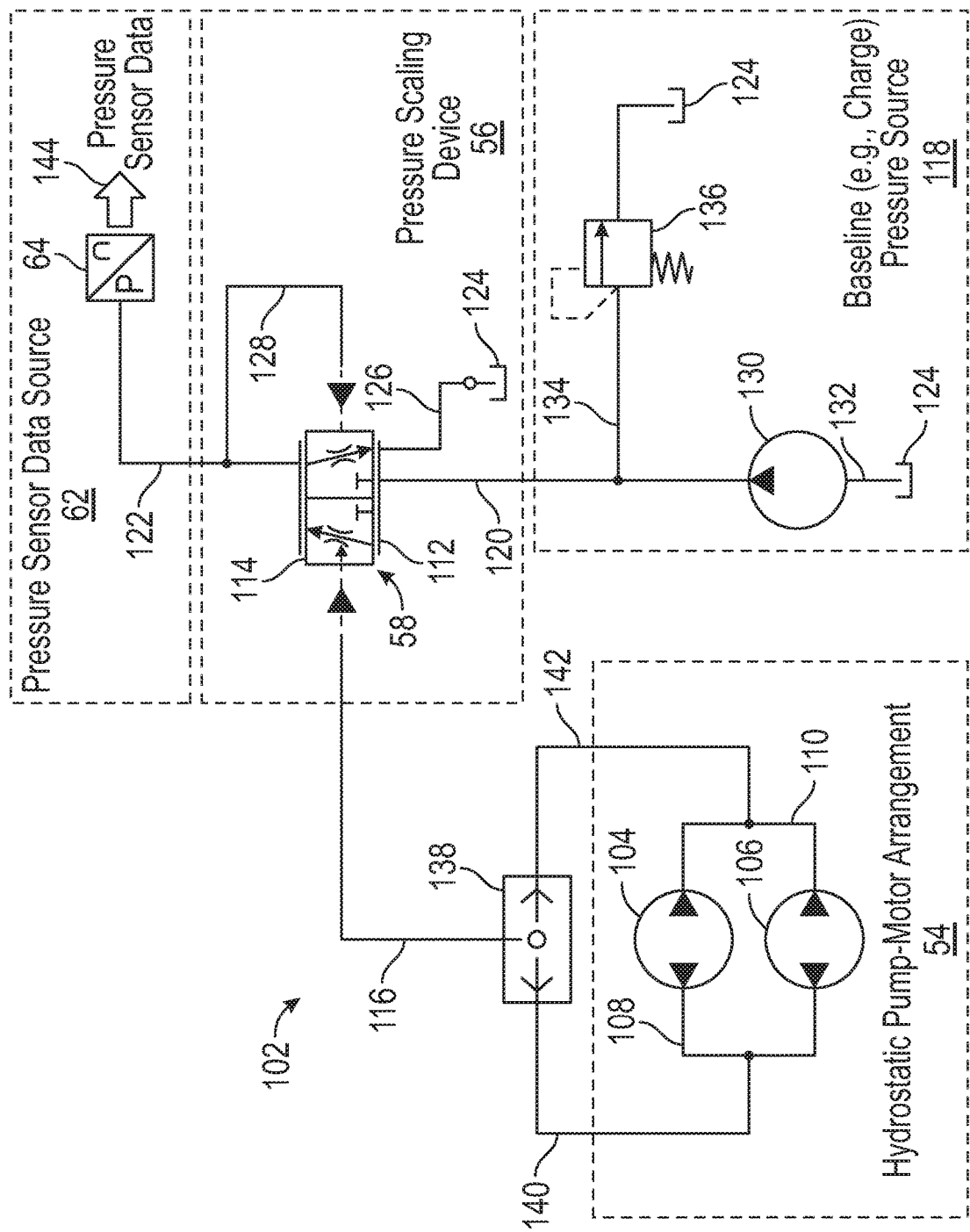
FIG. 4 is a flow schematic of the hydrostatic transmission pressure monitoring system illustrated in FIGS. 1-3, as depicted in accordance with an example embodiment.

Advancing to FIG. 4, a flow schematic 102 of the hydrostatic transmission pressure monitoring system 22 is presented in accordance with an example embodiment of the present disclosure. Reference numerals are carried forward from FIGS. 1-3 as appropriate, noting that the illustrated schematic 102 presents but one possible implementation of the example pressure monitoring system 22. The hydrostatic pump-motor arrangement 54 is shown in a lower left portion of this drawing figure and includes a first hydraulic device 104 (e.g., corresponding to the axial piston device 78 shown in FIG. 2), a second hydraulic device 106 (e.g., corresponding to the axial piston device 80 shown in FIG. 2), and a hydraulic pump-motor circuit 108, 110. The hydraulic pump-motor circuit 108, 110 includes, in turn, a first side or flow loop section 108 and a second side or flow loop section 110. The first flow loop section 108 fluidly connects a first port of the hydraulic device 104 to a second port of the hydraulic device 106, while the second flow loop section 110 fluidly connects a third port of the hydraulic device 104 to a fourth port of the hydraulic device 106. A circuit 108, 110 is thus created in which pressurized hydraulic fluid can flow: (i) in a first direction (e.g., a clockwise direction in the schematic of FIG. 4) when the hydraulic pump-motor circuit 108, 110 is driven in a first rotational direction via corresponding pumping action of either of the hydraulic devices 104, 106 (with the other hydraulic device 104, 106 then serving as a motor); or (ii) a second direction (e.g., a counterclockwise direction in the illustrated schematic) when the hydraulic pump-motor circuit 108, 110 is driven in a second, opposing rotational direction via pumping action of one of the hydraulic devices 104, 106 (with the other hydraulic device 104, 106 acting as a motor).

The hydrostatic transmission pressure monitoring system 22 further includes a pressure scaling device 56 and a pressure sensor data source 62. In the illustrated example, the pressure sensor data source 62 contains or assumes the form of a single pressure sensor 64. The pressure sensor 64 may be transducer for converting the fluidic signal received via flow line 122 (the pressure-scaled output signal generated by the PSV 58, as described below) to an electrical signal suitable for application to the controller 52 via the wired or wireless data connection 66 (FIG. 1). Stated differently, the pressure sensor 64 generates pressure sensor data 144 (corresponding to the arrow 66 in FIG. 1), which is forwarded to the controller 52 (FIG. 1) for processing and which describes the magnitude of the pressure detected by the sensor 64 from the hydraulic fluid within flow line 122. Similarly, the pressure scaling device 56 likewise contains a single PSV 58, which is fluidly coupled to the pressure sensor 64 for supplying the pressure-scaled output signal thereto. In alternative embodiments, the pressure scaling device 56 may contain multiple PSVs and/or the pressure sensor data source 62 may contain multiple pressure sensors 64, as further discussed below in connection with FIG. 7.

In the illustrated example, the PSV 58 assumes the form of a spool-type valve including a housing or sleeve 112 in which a translating valve element or piston (hereafter, "spool 114") is slidably disposed. In addition to the spool 114 and the surrounding sleeve 112, the PSV 58 further includes the follow ports, most or all of which are formed in the sleeve 112: (i) a first port (herein, the "PSV sense port") fluidly coupled to the pump-motor circuit 108, 110 by a flow line 116, (ii) a second port (herein, the "PSV baseline pressure inlet") fluidly coupled to a baseline pressure source 118 by a flow line 120, (iii) a third port (herein, the "PSV signal outlet") fluidly coupled to the pressure sensor 64 by a flow line 122, (iv) a fourth port (herein, the "PSV drainage outlet") fluidly coupled to a sump 124 by a flow line 126, (v) a fifth port (herein, the "PSV pressure balance port") fluidly coupled to flow line 122 via a pressure balance flow line 128.

As further symbolically indicated in FIG. 4, the PSV spool 114 is movable between two translational extremes. In the first translational extreme (depicted on the right side of the spool symbol in the drawing figure), the PSV spool 114 is positioned to fluidly connect the flow lines 122, 126, while providing a controlled (metered) minimal flow impedance or resistance therebetween. In particular, a metering orifice or flow restriction formed in the PSV spool 114 may be moved into full alignment between the ports connecting the flow lines 122, 126 to allow hydraulic fluid flow between the flow lines 122, 126 at a desired stable rate when the PSV spool 114 is moved into the first translational position. Accordingly, when the PSV spool 114 is moved into this position (shown), the PSV 58 provides a controlled, minimal impedance to the return of hydraulic fluid to the sump 124 from the flow line 122 and the input of the pressure sensor 64. Also, when so positioned, the PSV spool 114 fluidly disconnects the flow lines 120, 122 such that the pressure sensor 64 is fluidly isolated from the baseline pressure source 118. Conversely, in the second translational or positional extreme (depicted on the left side of the spool symbol in FIG. 4), the PSV 58 fluidly joins the flow lines 120, 122 such that a controlled, minimal flow impedance is provided from the baseline (e.g., charge) pressure source 118 to the pressure sensor 64; e.g., in this position, the metering orifice of the PSV spool 114 is fully aligned between the ports coupled to the flow lines 120, 122 to provide metered flow between the flow lines 120, 122 for pressure stability. Concurrently, when the PSV spool is moved into this second positional extreme, the PSV spool 114 is positioned such that the PSV 58 fluidly isolates the flow line 122 from the drain line 126 and hydraulic flow from the pressure sensor 64 to the sump 124 is blocked or obstructed.

Describing now the baseline (e.g., charge) pressure source 118 in greater detail, the baseline pressure source 118 can be realized utilizing any hydraulic device or combination of hydraulic devices suitable for supplying hydraulic fluid at a baseline pressure less than the peak circuit pressure within the hydraulic pump-motor circuit 108, 110. It may also be desirable for the pressure source 118 to supply hydraulic fluid at a baseline (e.g., charge) pressure at or above a maximum desired reading of the pressure sensor 64; a pressure sensor reading corresponding to torque saturation in the illustrated example. As indicated in FIG. 4, it may be beneficial to leverage the charge pressure source for usage as the baseline pressure source 118 in embodiments. Generally, such a charge pressure source provides hydraulic fluid drawn from a tank (e.g., an oil reservoir) at a relatively low pressure, which is then supplied to the low pressure side of the hydraulic pump-motor circuit 108, 110 included in the hydrostatic pump-motor arrangement 54. Supplying such a charge pressure to the low pressure side of the hydraulic pump-motor circuit 108, 110 reduces the likelihood of cavitation and provides other benefits, such as replenishing any hydraulic fluid lost to leakage when operating the hydraulic devices 104, 106 and may also help cool the heated hydraulic fluid. By leveraging the charge pressure source for usage as the baseline pressure source 118 in this manner, the overall part count, cost, and complexity of the hydrostatic transmission pressure monitoring system 22 can be reduced. This stated, the hydrostatic transmission pressure monitoring system 22 may functional equally well when another known baseline pressure is applied to the baseline pressure inlet of the PSV 58 via the flow line 120, as further described below, providing that the baseline pressure is less than the peak circuit pressure occurring within the hydraulic pump-motor circuit 108, 110 when loaded and driven in a particular direction.

In the example flow schematic 102 of FIG. 4, the baseline (e.g., charge) pressure source 118 is realized utilizing a charge pump 130 having an inlet, which is coupled to the sump 124 via a flow line 132; and having an outlet, which is coupled to the appropriate port of the PSV 58 (namely, the "PSV baseline pressure inlet") via the flow line 120. A pressure relief flow line 134 is located downstream of the charge pump 130 and fluidly connects the flow line 120 to the sump 124. A pressure relief valve 136 is positioned in the pressure relief flow line 134. The pressure relief valve 136 is tuned to divert excess pump flow from the flow line 120, and therefore from the output of the charge pump 130, when the pressure within the flow lines 120, 134 exceeds a set upper threshold. Hydraulic pressure accumulates within the flow lines 120, 134 as the charge pump 130 is driven, with the pressure relief valve 136 opening to varying degrees to divert excess pump flow to the sump 124 and prevent excess pressure accumulation within the flow line 120. The pressure relief valve 136 will likewise move into a fully open position to allow return of the pump discharge to the sump 124 when the PSV spool 114 is in the position shown in FIG. 4 and flow received at the PSV baseline pressure inlet of the PSV 58 is blocked.

The maximum permissible charge pressure, as selected via tuning of the pressure relief valve 136, will vary between different implementations. This stated, the maximum charge pressure may be less than 100 bar, preferably less than 50 bar, and more preferably less than or equal to 20 bar in at least some implementations. Due to the below-described functioning of the PSV 58, the pressure-scaled output signal generated by the pressure scaling device 56 and ultimately supplied to the pressure sensor 64 is maintained at or below the baseline (e.g., charge) pressure input supplied by the baseline pressure source 118. Consequently, when the charge is selected to be relatively low as compared to the peak or high side circuit pressures occurring within the hydraulic pump-motor circuit 108, 110 (which may approach or exceed 700 to 1000 bar in embodiments), the maximum or peak magnitude of the pressure-scaled output signal generated by the PSV 58 will likewise be limited to a small fraction of the peak (high side) circuit pressure occurring within the hydraulic pump-motor circuit 108, 110, as further discussed below.

The location at which the peak or high side pressure occurs within the hydraulic pump-motor circuit 108, 110 varies with time depending upon the direction in which the hydrostatic pump-motor arrangement 54 is driven. Consider an example scenario in which the hydraulic device 104 operates as a pump, the hydraulic device 106 operates as a motor under load, and the hydrostatic pump-motor arrangement 54 is driven in a first rotational direction in which flow within the hydraulic pump-motor circuit 108, 110 occurs in a clockwise direction in the context of the illustrated flow schematic 102. In this instance, the peak or high side pressure occurs within the right side of the hydraulic pump-motor circuit 108, 110 (within the flow loop section 110) as the hydraulic fluid discharged from the hydraulic device 104 (here, operating as a pump) performs work to turn the shaft of the hydraulic device 106 (operating as a motor) and thereby satisfy the torque demands placed on the hydrostatic pump-motor arrangement 54. Pressure build-up or accumulation consequently occurs within the flow loop section 110 resulting in a peak (high side) circuit pressure at this location of the hydraulic pump-motor circuit 108, 110. Concurrently, a low hydraulic pressure develops within the flow loop section 108 (the "low side" of the hydraulic pump-motor circuit 108, 110), with the charge pressure delivered to the flow loop section 108 via non-illustrated conduits and valving to reduce the likelihood of cavitation within the hydraulic device(s) 104, 106. Conversely, in an example scenario in which the hydraulic pump-motor circuit 108, 110 is driven in the opposing direction (e.g., counterclockwise in the schematic of FIG. 4), the peak or high side pressure occurs within the left side of the hydraulic pump-motor circuit 108, 110 (that is, within the flow loop section 108). The peak (high side) circuit pressure thus effectively switches or toggles between the opposing sides or flow loop sections 108, 110 of the hydraulic pump-motor circuit 108, 110, depending upon the particular direction in which the hydrostatic pump-motor arrangement 54 is driven at a given juncture in time.

Different approaches can be employed to address this locational variability in the peak or high side circuit pressure. In the example of FIG. 4, specifically, a switching valve 138 is employed for this purpose, with the switching valve 138 fluidly coupled between the PSV 58 and the hydraulic pump-motor circuit 108, 110. In this regard, the switching valve 138 has a first inlet coupled to the flow loop section 108 via a flow line 140, a second inlet coupled to the flow loop section 110 via a flow line 142, and an outlet fluidly coupled to the sense port of the PSV 58 via the flow line 116. The switching valve 138 is bistable and moveable between: (i) a first stable position in which the switching valve 138 routes the pressure within the flow loop section 108, through the flow lines 116, 140, and to the sense port of the PSV 58; and (ii) a second stable position in which the switching valve 138 routes the pressure within the flow loop section 110, through the flow lines 116, 142, and to the PSV sense port. In either bistable valve position, the switching valve 138 fluidly isolates the flow lines 140, 142 to prevent bridging of the hydraulic pump-motor circuit 108, 110. Accordingly, in the first position, the switching valve 138 fluidly isolates the flow line 142 (and therefore the pressure within the flow loop section 110) from the flow line 116 and the sense port of the PSV 58. Conversely, in the second position, the switching valve 138 fluidly isolates the flow line 140, and thus the pressure within the flow loop section 108, from the flow line 116 and the PSV 58.

The switching valve 138 is positioned to route the pressure within the flow loop section 108 to the sense port of the PSV 58 when the hydrostatic pump-motor arrangement 54 is driven in a direction at which the peak (high side) circuit pressure occurs within the left side or flow loop section 108 of the hydraulic pump-motor circuit 108, 110. Conversely, the switching valve 138 is positioned to port the pressure within the flow loop section 110 to the PSV 58 when the hydrostatic pump-motor arrangement 54 is driven in an opposing direction at which the peak (high side) pressure occurs within the opposing flow loop section 110. The switching valve 138 can transition between these positions in any suitable manner. In various embodiments, the switching valve 138 is pressure-actuated and transitions between the bistable positions in response to variations in the pressure differential across the inlets of the switching valve 138. In such embodiments, the switching valve 138 is conveniently implemented as a self-actuating or pressure-actuated ball valve; however, the switching valve 138 can assume any form suitable for providing such a self-actuated, pressure-routing function. In other instances, the switching valve 138 may be actuated in another manner, such as utilizing a solenoid operably coupled to the controller 52. In still other implementations, such a switching valve can be integrated into a common structure with a non-illustrated directional flow valve utilized to selectively route the charge pressure generated by the baseline (e.g., charge) pressure source 118 to the low side of the hydraulic pump-motor circuit 108, 110.

The operation of the PSV 58 will now be discussed in greater detail with reference to FIG. 5, which generically illustrates one possible structural implementations of the PSV 58. Referring to this figure, the various ports of the PSV 58 are numerically labeled as follows: the PSV sense port is identified by reference numeral 146, the PSV baseline pressure inlet is identified by reference numeral 148, the PSV signal outlet is identified by reference numeral 150, the PSV drainage outlet is identified by reference numeral 152, and the PSV pressure balance port is identified by reference numeral 154. In this example, the PSV spool 114 is produced to include a large diameter body portion 156 from which a small diameter head or "sense pin" 158 extends. An annulus 160 (e.g., a 360 degree cut-out) is formed in the large diameter body portion 156. Further, an end portion of the spool 114 cooperates with the surrounding housing or sleeve 112 to define a damping or pressure balance chamber 162, which is fluidly connected to the annulus 160 via a flow passage 164 formed in the spool 114. A spring 166 may be disposed within the pressure balance chamber 162 to exert a resilient bias force on the spool 114 urging translational movement of the spool 114 towards a seated position (downward in the illustrated orientation of FIG. 5 in a direction opposite the pressure balance chamber 162). In other embodiments, such a spring 166 or another resilient bias device may be omitted, with the hydraulic pressure within the pressure balance chamber 162 providing the desired translational movement of the spool 114; the pressure within the pressure balance chamber 162 acting on the effective area of the spool face 168 exposed from within the chamber 162 and antagonistic to the pressure acting on the effective area of the face 168 of the spool sense pin 158.

The spool 114 of the PSV 58 is movable between two positional or translational extremes, as previously described. In a seated position, the spool 114 positioned such that the pin face 170 of the spool 114 (and the surrounding shoulder of the spool 114) seats on the ledge adjacent the PSV sense port 146. This position corresponds to the position denoted on the right side of the PSV spool symbol in FIG. 4. When the PSV 58 resides in the seated position, the PSV spool 114 is positioned such that the annulus 160 formed in the spool 114 fluidly connects the PSV signal outlet 150 and the PSV drainage outlet 152. This allows return of hydraulic fluid from the flow line 122 and from the pressure balance chamber 162 to the sump 124, as needed. The spool 114 is moved into this position (the seated position) when the force exerted on the sense pin face 170 by the hydraulic pressure supplied to the PSV sense port 146 (urging spool movement in an upward direction toward the pressure balancing chamber 162) is surpassed by the cumulative antagonistic force exerted on the spool 114; that is, the force entered on the spool by the return spring 166 and the hydraulic fluid within the pressure balance chamber 162 (acting on the larger spool face 168), which collectively urging spool movement in a second, opposing direction (upward in the illustrated example). The PSV spool 114 will thus be maintained in a seated position blocking hydraulic fluid from the baseline pressure inlet 148 to the signal outlet 150 when the pressure applied to PSV sense port 146 is relatively low, as may occur when the hydrostatic pump-motor arrangement 54 (FIG. 4) is inactive.

When the hydrostatic pump-motor arrangement 54 is driven under load, a highly elevated, peak circuit pressure occurs within the hydraulic pump-motor circuit 108, 110. This peak circuit pressure is routed to the PSV sense port 146 of the PSV 58 via operation of the switching valve 138 (FIG. 4), as previously described, and acts on the exposed area of the sense pin 158 (again, referred to herein as the "sense pin face 170"). When the force exerted on the sense pin face 170 by the peak circuit pressure is sufficient to overcome the force exerted on the opposing face 168 of the PSV spool 114 taken in combination with the force of spring 166 (when present), the spool 114 lifts from its seat and moves toward the pressure balance chamber 162 (upward in the illustrated example). As the spool 114 lifts from its seated position, the annulus 160 no longer aligns with the drainage outlet 152; and, thus, the PSV signal outlet 150 is fluidly isolated from the PSV drainage outlet 152. Concurrently, the annulus 160 moves into a position fluidly coupling the baseline pressure inlet 148 to the PSV signal outlet 150. The degree to which the annulus 160 aligns with the baseline pressure inlet 148 varies, depending upon the translational position of the spool 114.

Figure 5:
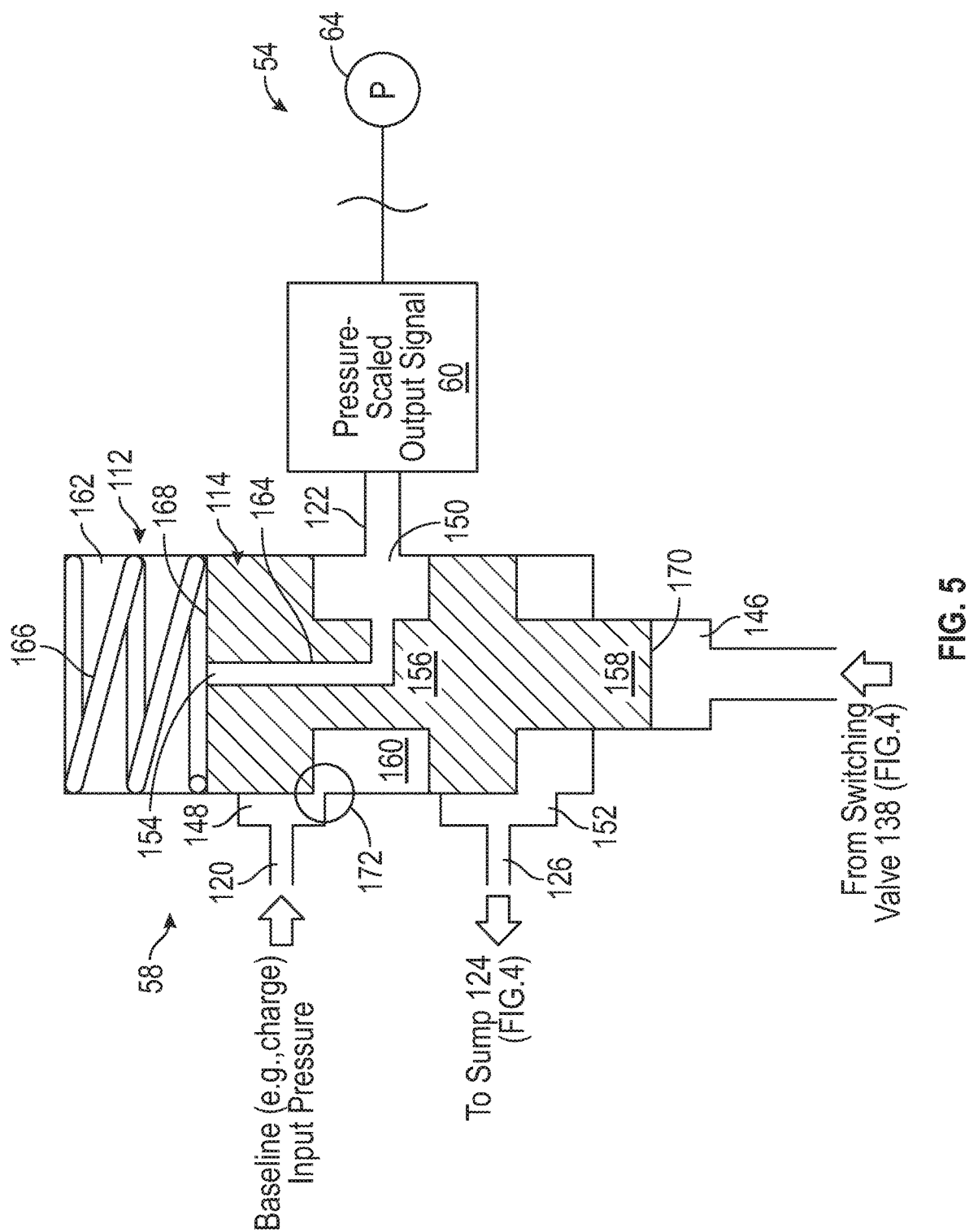
FIG. 5 is a cross-sectional schematic of a PSV suitably included in the hydrostatic transmission pressure monitoring system shown in FIGS. 1-4.

In the illustrated position shown in FIG. 5, for example, a low to moderate peak circuit pressure is applied to the PSV sense port 146 such that the PSV spool 114 slides into an intermediate or middle position between its translational extremes. In this position, the baseline pressure inlet 148 is fluidly coupled to the annulus 160 (and, therefore, to the PSV signal outlet 150) through a relatively tight flow restriction, as called-out by circle 172. As a result, a small fraction of the baseline input pressure supplied to the baseline pressure inlet 148 is conducted to the PSV signal outlet 150 and to the pressure sensor 64. As the magnitude of the pressure applied to the PSV sense port 146 increases, the PSV spool 114 moves increasingly away from the PSV sense port 146 and toward the pressure balance chamber 162 (upward in the illustrated orientation). This results in a corresponding increase in the size of the flow restriction between the baseline pressure inlet 148 and the annulus 160 as the annulus 160 increasingly moves into alignment with the baseline pressure inlet 148. A greater fraction of the baseline input pressure is thus transported across the PSV 58 and to the pressure sensor 64, with the translational position of the PSV spool 114 continually modulated (and thus the flow impedance between the ports 148, 150 continually varying) in response to variations in the peak circuit pressure appearing at the PSV sense port 146 and acting on the sense pin face 170.

In the above-described manner, the PSV 58 serves as a mechanical scaling mechanism, which generates a pressure-scaled output signal substantially proportional to the magnitude of the peak circuit pressure applied to the PSV sense port 146. For example, in various embodiments, the PSV 58 may be tuned (e.g., via sizing of the effective areas of the spool 114, the location and dimensions of the PSV ports, and the characteristics of the spring 166, if present) such that approximately 0% of the baseline input pressure appears at the PSV signal outlet 150 when the peak circuit pressure is below a minimum value (or at a zero value), approximately 50% of the baseline input pressure appears at the PSV signal outlet 150 when the peak circuit pressure is abut 50% of the expected operational pressure range, and approximately 100% (or some predetermined maximum fraction) of the baseline input pressure appears at the PSV signal outlet 150 when the peak circuit pressure reaches approximately 100% of the expected operational pressure range. The pressure sensing capabilities of the pressure sensor 64 may likewise be selected to accommodate the maximum expected pressures appearing at the PSV signal outlet 150, which will be equal to or less than the baseline (e.g., charge) input pressure across all positions of the PSV spool 114.

The pressure scaling function of the PSV 58 is achieved, at least in part, due to the low magnitude of the baseline input pressure as compared to the peak circuit pressure; and, further, due to differential in the effective surface areas of the opposing faces 168, 170 of the PSV spool 114. In this latter regard, the effective area of the spool face 168 exposed within the pressure balance chamber 162 may be at least twice, if not at least 10 times the effective area of the sense pin face 170 exposed at the PSV sense port 146 in various implementations of the PSV 58. Moreover, and as noted above, the baseline input pressure supplied to the baseline pressure inlet 148 may be significantly less (e.g., at least ten times less) than the peak circuit pressure in embodiments. In this regard, the baseline input pressure may be less than 50 bar, and perhaps may be around 20 bar, while the peak circuit pressure may approach or exceed 700 bar when the hydrostatic pump-motor arrangement 54 is driven in a particular direction under load. Further, and depending upon the manner in which the hydrostatic transmission pressure monitoring system 22 is implemented, the baseline input pressure may vary within limits; e.g., in one embodiment, variations of 25% or less in the baseline pressure may occur during operation of the baseline (e.g., charge) pressure source 118 (FIG. 4). Such variations in the baseline pressure (if occurring) are largely, if not wholly compensated by porting the baseline pressure to the pressure balance chamber 162 via the flow passage 164. For example, should the baseline pressure decrease by a small amount (e.g., by 10% or more), the spool 114 will move further toward the pressure balance chamber 162 and away from the PSV sense port 146 (upward in the illustrated orientation) to reduce the flow restriction between the ports 148, 150, thereby compensating for the slight decrease in the baseline input pressure in generating the pressure-scaled output signal 60.

Figure 6:
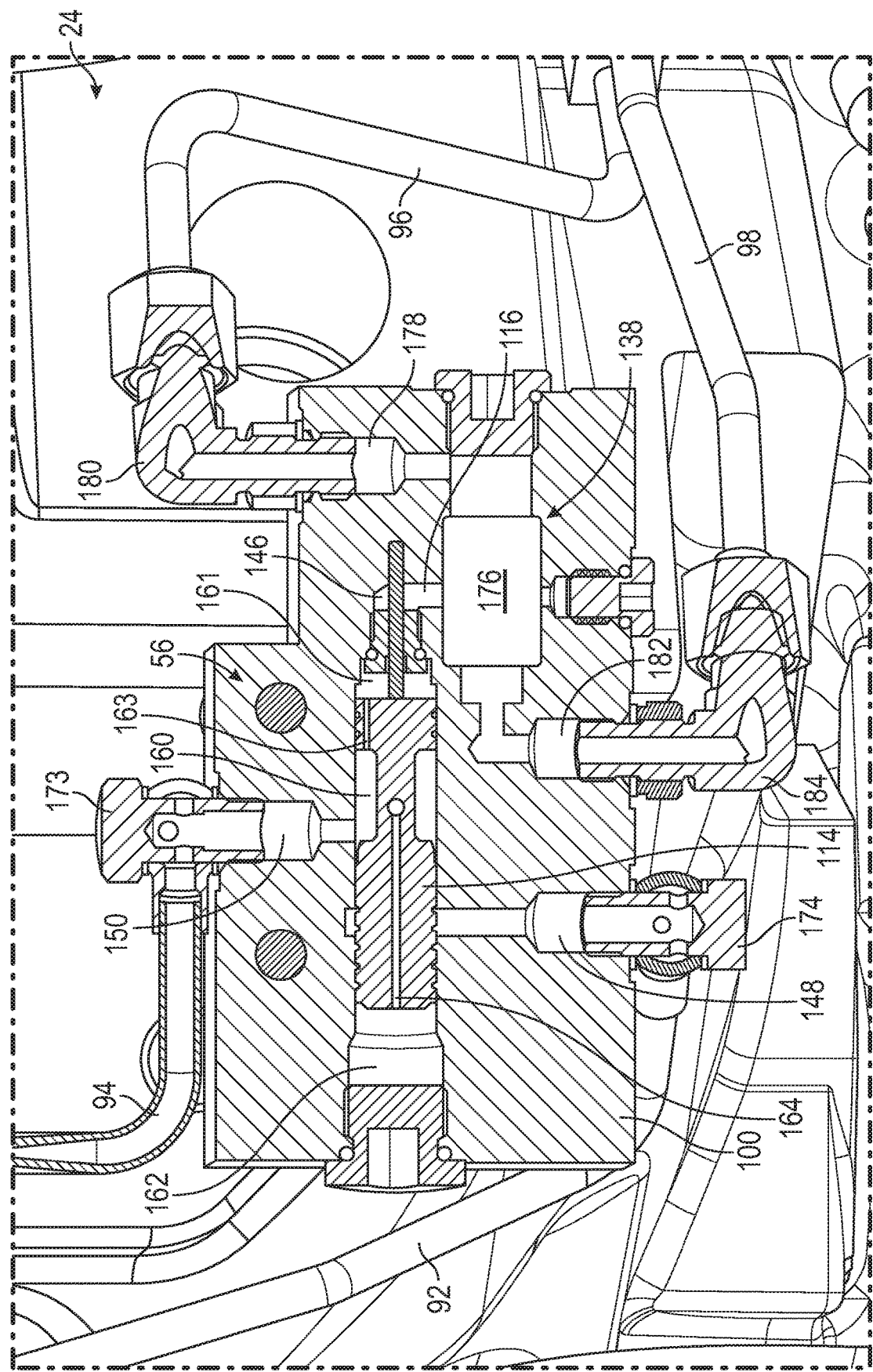
FIG. 6 is a cross-sectional view illustrating one manner in which the PSV schematically illustrated in FIG. 5 may be structurally implemented when integrated into the example embodiment of FIG. 3.

Turning now to FIG. 6, one manner in which the PSV 58 may be structurally implemented when integrated into the example embodiment of FIG. 3 is depicted in cross-section. Comparting FIG. 6 to FIGS. 3-5, the illustrated flow line 94 corresponds to the flow line 122, which is connected to the PSV signal outlet 150 of the pressure sensor 64 by a first fitting 173; and the flow line 92 corresponds to the flow line 120, which is joined to the baseline pressure inlet 148 by a second fitting 174. The switching valve 138 is further shown in FIG. 6, with the valve element 176 of the valve 138 drawn schematically. The switching valve 138 includes a first inlet 178 connected to the flow line 96 via a fitting 180 and a second port 182 connected to the flow line 98 via a fitting 184. The flow lines 96, 98 (which corresponding to the flow lines 140, 142 shown in FIG. 4) are, in turn, fluidly coupled to the flow loop sections 108, 110 of the hydraulic pump-motor arrangement 54, as previously described. Thus, in keeping with the foregoing description, the switching valve routes the high side or peak circuit pressure to the PSV sense port 146, with the translational position of the spool 114 varying in relation to the magnitude of the peak circuit pressure. As the peak circuit pressure delivered to the PSV sense port 146 increases, the spool 114 moves increasingly away from its seated position and toward the pressure balance chamber 162 (which lacks the spring 166 in this implementation) to bring the annulus 160 into increasing alignment with the baseline pressure inlet 148. As the baseline pressure inlet 148 and the annulus 160 are brought into greater alignment, the flow impedance between the baseline pressure inlet 148 and the PSV signal outlet 150 decreases, thereby generating a pressure-scaled output signal indicative of the magnitude of the peak circuit pressure appearing at the PSV sense port 146. The pressure-scaled output signal is then directed through the flow line 94 to the pressure sensor 64, which is advantageously (although not necessarily) located offboard the pivoting yoke assembly 72, as previously described. Finally, sliding movement of the spool 114 is facilitated by the provision of a drain orifice 163 connecting the annulus 160 to a cavity 161, which is vented to the sump 124 (FIG. 4).

There has thus been provided an example embodiment of a hydrostatic transmission pressure monitoring system including a pressure scaling device, which generates a reduced pressure, scaled fluidic signal (the pressure-scaled output signal) indicative of the peak or high side circuit pressure within a hydraulic pump-motor circuit of a hydromechanical IVT (or other hydrostatic transmission). In the above-described example embodiment, the pressure scaling device contained a single PSV, which was fluidly coupled to both sides or loop sections of the hydraulic pump-motor circuit via a switching valve. In embodiments in which the hydrostatic transmission contains a hydrostatic pump-motor arrangement driven exclusively in a single direction such that the peak circuit pressure occurs consistently within a particular side or loop section of the corresponding hydraulic pump-motor circuit, such a switching valve may be omitted and the sense port of the PSV may be directly fluidly coupled to the loop section in which the peak circuit pressure consistently occurs. Similarly, a switching valve may be omitted from the hydrostatic transmission pressure monitoring system in implementations in which the pressure scaling device contains two PSVs, each fluidly connected to a different side or loop section of the hydraulic pump-motor circuit. An example of such a hydraulic architecture will now be described in conjunction with FIG. 7.

Addressing lastly FIG. 7, a hydrostatic transmission pressure monitoring system 186 is illustrated in accordance with a further example embodiment, with the previously-introduced reference numerals carried forward to denote like features. In many respects, the hydrostatic transmission pressure monitoring system 186 is similar to the hydrostatic pressure monitoring system 22 described above in connection with FIGS. 1-6, with particular attention direction to FIG. 4 as a point of comparison. For example, as was previously the case, the hydrostatic transmission pressure monitoring system 186 includes a hydrostatic pump-motor arrangement 54 and a baseline (e.g., charge) pressure source 118 similar or identical to that described above. The hydrostatic transmission pressure monitoring system 186 further includes a pressure scaling device 188 fluidly coupled to each loop section of the hydraulic pump-motor circuit 108, 110; however, in this case, the pressure scaling device 188 contains two PSVs 58-1, 58-2, each of which may be similar or substantially identical to the PSV 58 described above in conjunction with FIGS. 4-6. The sense port of the first PSV 58-1 is fluidly coupled to the loop section 108 via a flow line 190, while the sense port of the second PSV 58-2 is fluidly coupled to the loop section 110 via a flow line 192. The various other ports of the PSVs 58-1, 58-2 are fluidly interconnected to the sump 124, the baseline (e.g., charge) pressure source 188, and the pressure balance flow lines 128-1, 128-2 in a manner analogous to that previously discussed. As one notable difference, however, the signal outlet ports of the PSVs 58-1, 58-2 are each fluidly coupled to a different pressure sensor 64-1, 64-2 (collectively forming a "pressure sensor data source 64-1, 64-2), as illustrated in the upper left and right corners of FIG. 7.

During operation of the hydrostatic transmission pressure monitoring system 186, and depending upon the particular direction in which the hydrostatic pump-motor arrangement 54 is driven, the peak or high side circuit pressure occurring within the hydraulic pump-motor circuit 108, 110 is supplied to the sense port of one of the PSVs 58-1, 58-2, which then generates a pressure-scaled output signal substantially proportional to or otherwise indicative of the sensed pressure. The corresponding pressure sensor 64-1, 64-2 then converts this fluidic signal to an electronic (digital or analog) signal included in the pressure sensor data 144, which is then forward to a controller (e.g., analogous to the controller 52 shown in FIG. 1) for usage in monitoring the peak circuit pressure within the hydraulic pump-motor circuit 108, 110 and, perhaps, for usage in calculating other pressure-related parameters pertaining to the hydrostatic transmission, such as the current magnitude of torque transfer through the hydrostatic pump-motor arrangement 54. Concurrently, the PSV 58-1, 58-2 fluidly coupled to the low side of the hydraulic pump-motor circuit 108, 110 (that is, the loop section 108, 110 in which the low pressure presently occurs), likewise generates a fluidic signal supplied to the corresponding pressure sensor 64-1, 64-2, which then generates an electrical signal forwarded to the controller as part of the pressure sensor data 144.

By virtue of the inclusion of two PSVs 58-1, 58-2 within the pressure scaling device 188, the hydrostatic transmission pressure monitoring system 186 achieves several benefits. First, the need for a switching valve, such as the switching valve 138 (FIGS. 4 and 6) is eliminated. Second, the controller 52 can determine the particular direction in which the hydrostatic pump-motor arrangement 54 is driven at a particular juncture in time based solely upon the pressure sensor data 144. Third, in embodiments in which the PSVs 58-1, 58-2 and the corresponding pressure sensors 64-1, 64-2 are sufficiently sensitive to enable accurate monitoring of the low side pressure within the hydraulic pump-motor circuit 108, 110, the controller 52 may monitor the baseline (e.g., charge) pressure for unexpected or unusual variations therein; e.g., for diagnostic purposes. Additionally, should variations in the baseline (e.g., charge) pressure have a material impact on the accuracy of the high side pressure sensing functionality of the hydrostatic transmission pressure monitoring system 186, the controller 52 may compensate for such variations. These benefits notwithstanding, the inclusion of an additional PSV and an additional pressure sensor may increase part count, overall cost, and add complexity in the routing scheme utilized to conduct the fluidic signals generated by the PSVs 58-1, 58-2 to the corresponding pressure sensors 64-1, 64-2, which, as previously noted, may be located offboard a pivoting yoke assembly, such as the pivoting yoke assembly 72 described above in connection with FIG. 3. Various other modifications may be made to the hydrostatic transmission pressure monitoring system 186 to yield still further embodiments of the present disclosure; e.g., in further embodiments, a single pressure sensor having multiple pressure sensing ports may be utilized in place of the illustrated pressure sensors 64-1, 64-2.

Enumerated Examples of the Hydrostatic Transmission Pressure Monitoring System

The following examples of the debris accumulation control system are further provided and numbered for ease of reference.

1. A hydrostatic transmission pressure monitoring system includes a hydrostatic transmission and a pressure sensor data source. The hydrostatic transmission includes, in turn, a transmission casing, a pivoting yoke assembly rotatably mounted in the transmission casing, a hydrostatic pump-motor arrangement containing a hydraulic pump-motor circuit at least partially formed in the pivoting yoke assembly, and a pressure scaling device fluidly coupled to the hydraulic pump-motor circuit. The pressure scaling device is configured to generate a pressure-scaled output signal substantially proportional to a peak circuit pressure within the hydraulic pump-motor circuit. The pressure sensor data source is fluidly coupled to the pressure scaling device and is configured to generate pressure sensor data indicative of the pressure-scaled output signal.

2. The hydrostatic transmission pressure monitoring system of example 1, further including a controller coupled to the pressure sensor data source and configured to utilize the pressure sensor data to monitor the peak circuit pressure within the hydraulic pump-motor circuit.

3. The hydrostatic transmission pressure monitoring system of example 2, wherein the hydrostatic transmission pressure monitoring system is utilized onboard a work vehicle having a work vehicle engine and a power takeoff (PTO) shaft. Further, the controller is configured to: (i) calculate a current torque transmitted through the hydrostatic pump-motor arrangement based, in part, on the peak circuit pressure; and (ii) selectively vary a power output of the work vehicle engine in response to variations in the current torque transmitted through the hydrostatic pump-motor arrangement relative to an estimated torque transmitted through the PTO shaft.

4. The hydrostatic transmission pressure monitoring system of example 1, wherein the hydrostatic transmission pressure monitoring system is utilized onboard a work vehicle. Additionally, the hydrostatic transmission further includes an input shaft, a first output shaft rotatably coupled to the input shaft along a first torque transmission path bypassing the hydrostatic pump-motor arrangement, and a second output shaft coupled to the input shaft along a second torque transmission path extending through the hydrostatic pump-motor arrangement.

5. The hydrostatic transmission pressure monitoring system of example 1, wherein the pressure scaling device includes a first pressure scaling valve (PSV) fluidly coupled to the pressure sensor data source and configured to generate the pressure-scaled output signal when the hydrostatic pump-motor arrangement is driven in at least a first rotational direction.

6. The hydrostatic transmission pressure monitoring system of example 5, wherein the pressure sensor data source includes a first pressure sensor fluidly coupled to the first PSV and located offboard the pivoting yoke assembly.

7. The hydrostatic transmission pressure monitoring system of example 5, wherein the first PSV includes a baseline pressure inlet at which a baseline input pressure is received, as well as a signal outlet at which the pressure-scaled output signal is generated from the baseline input pressure.

8. The hydrostatic transmission pressure monitoring system of example 7, further including a charge pressure source and a conduit. The charge pressure source is configured to supply the hydrostatic pump-motor arrangement with a charge pressure, while the conduit fluidly couples the charge pressure source to the baseline pressure inlet such that the charge pressure serves as the baseline input pressure.

9. The hydrostatic transmission pressure monitoring system of example 7, wherein the first PSV further includes a PSV sense port fluidly coupled to the hydraulic pump-motor circuit and at which the peak circuit pressure is received when the hydrostatic pump-motor arrangement is driven in at least the first rotational direction.

10. The hydrostatic transmission pressure monitoring system of example 9, wherein the first PSV further includes a spool and a sleeve in which the baseline pressure inlet, the signal outlet, and the PSV sense port are formed. The spool has a translational position within the sleeve controlling flow impedance from the baseline pressure inlet to the signal outlet, the translational position of the spool varying in conjunction with fluctuations in the peak circuit pressure received at the PSV sense port.

11. The hydrostatic transmission pressure monitoring system of example 5, wherein the hydraulic pump-motor circuit includes a first loop section containing the peak circuit pressure when the hydraulic pump-motor circuit is driven in the first rotational direction, and a second loop section containing the peak circuit pressure when the hydraulic pump-motor circuit is driven in a second rotational direction opposite the first rotational direction.

12. The hydrostatic transmission pressure monitoring system of example 11, wherein the hydrostatic transmission pressure monitoring system further includes a switching valve having a first inlet coupled to the first loop section, a second inlet coupled to the second loop section, and an outlet coupled to the first PSV.

13. The hydrostatic transmission pressure monitoring system of example 12, wherein the switching valve contains a valve element movable between: (i) a first position in which the switching valve routes a high pressure within the first loop section to the first PSV, while fluidly isolating the first PSV from the second loop section; and (ii) a second position in which the switching valve routes a high pressure within the second loop section to the first PSV, while fluidly isolating the first PSV from the first loop section.

14. The hydrostatic transmission pressure monitoring system of example 5, wherein the pressure sensor data source further includes a second PSV fluidly coupled to the pressure sensor data source. The second PSV is configured to generate the pressure-scaled output signal when the hydrostatic pump-motor arrangement is driven in a second rotational direction opposite the first rotational direction.

15. The hydrostatic transmission pressure monitoring system of example 1, wherein pressure-scaled output signal is at least ten times less than the peak circuit pressure when the hydrostatic pump-motor is driven in the first rotational direction.

CONCLUSION

There has thus been provided embodiments of a hydrostatic transmission pressure monitoring system, such a hydrostatic IVT pressure monitoring system, well-suited for deployment onboard work vehicles. The hydrostatic transmission pressure monitoring system incorporates unique structural features, including a pressure scaling device containing one or more PSVs, which facilitate peak or "high side" pressure monitoring during transmission operation. The pressure scaling device generates a pressure-scaled output signal, which is substantially proportional to (or otherwise indicative of) the peak pressure. At the same time, the pressure-scaled output signal is significantly less than the peak circuit pressure; e.g., in embodiments, the pressure-scaled output signal may be reduced relative to the peak circuit pressure by a factor of ten or more. Due to its reduced magnitude relative to the peak or high side circuit pressure, the pressure-scaled output signal can be measured utilizing pressure sensors having lower costs, higher accuracies, and/or greater durability levels as compared to specialized pressure sensors having high pressure sensing capabilities. Further, such pressure sensor(s) can be located offboard the pivoting yoke assembly, when included in the hydrostatic transmission, to ease sensor access and provide other benefits. A controller operably coupled to the sensor(s) can then utilize the data provided thereby to monitor the peak circuit pressure during transmission operation and, perhaps, utilize this data input to monitor other pressure-related parameters pertaining to the hydrostatic transmission, such as the torque transmitted through the hydrostatic pump-motor arrangement at any given juncture in time.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hydrostatic transmission pressure monitoring system, comprising:
   a hydrostatic transmission, comprising:
     a transmission casing;
     a pivoting yoke assembly rotatably mounted in the transmission casing;
     a hydrostatic pump-motor arrangement including a hydraulic pump-motor circuit at least partially formed in the pivoting yoke assembly; and
     a pressure scaling device fluidly coupled to the hydraulic pump-motor circuit and configured to generate a pressure-scaled output signal substantially proportional to a peak circuit pressure within the hydraulic pump-motor circuit; and
   a pressure sensor data source fluidly coupled to the pressure scaling device and configured to generate pressure sensor data indicative of the pressure-scaled output signal.

2. The hydrostatic transmission pressure monitoring system of claim 1, further comprising a controller coupled to the pressure sensor data source and configured to utilize the pressure sensor data to monitor the peak circuit pressure within the hydraulic pump-motor circuit.

3. The hydrostatic transmission pressure monitoring system of claim 2, wherein the hydrostatic transmission pressure monitoring system is utilized onboard a work vehicle having a work vehicle engine and a power takeoff (PTO) shaft; and
   wherein the controller is further configured to:
     calculate a current torque transmitted through the hydrostatic pump-motor arrangement based, in part, on the peak circuit pressure; and
     selectively vary a power output of the work vehicle engine in response to variations in the current torque transmitted through the hydrostatic pump-motor arrangement relative to an estimated torque transmitted through the PTO shaft.

4. The hydrostatic transmission pressure monitoring system of claim 1, wherein the hydrostatic transmission pressure monitoring system is utilized onboard a work vehicle; and
   wherein the hydrostatic transmission further comprises:
     an input shaft;
     a first output shaft rotatably coupled to the input shaft along a first torque transmission path bypassing the hydrostatic pump-motor arrangement; and
     a second output shaft coupled to the input shaft along a second torque transmission path extending through the hydrostatic pump-motor arrangement.

5. The hydrostatic transmission pressure monitoring system of claim 1, wherein the pressure scaling device comprises a first pressure scaling valve (PSV) fluidly coupled to the pressure sensor data source and configured to generate the pressure-scaled output signal when the hydrostatic pump-motor arrangement is driven in at least a first rotational direction.

6. The hydrostatic transmission pressure monitoring system of claim 5, wherein the pressure sensor data source comprises a first pressure sensor fluidly coupled to the first PSV and located offboard the pivoting yoke assembly.

7. The hydrostatic transmission pressure monitoring system of claim 5, wherein the first PSV comprises:
   a baseline pressure inlet at which a baseline input pressure is received; and
   a signal outlet at which the pressure-scaled output signal is generated from the baseline input pressure.

8. The hydrostatic transmission pressure monitoring system of claim 7, further comprising:
   a charge pressure source configured to supply the hydrostatic pump-motor arrangement with a charge pressure; and
   a conduit fluidly coupling the charge pressure source to the baseline pressure inlet such that the charge pressure serves as the baseline input pressure.

9. The hydrostatic transmission pressure monitoring system of claim 7, wherein the first PSV further comprises a PSV sense port fluidly coupled to the hydraulic pump-motor circuit and at which the peak circuit pressure is received when the hydrostatic pump-motor arrangement is driven in at least the first rotational direction.

10. The hydrostatic transmission pressure monitoring system of claim 9, wherein the first PSV further comprises:
   a sleeve in which the baseline pressure inlet, the signal outlet, and the PSV sense port are formed; and
   a spool having a translational position within the sleeve controlling flow impedance from the baseline pressure inlet to the signal outlet, the translational position of the spool varying in conjunction with fluctuations in the peak circuit pressure received at the PSV sense port.

11. The hydrostatic transmission pressure monitoring system of claim 5, wherein the hydraulic pump-motor circuit comprises:
   a first loop section containing the peak circuit pressure when the hydraulic pump-motor circuit is driven in the first rotational direction; and
   a second loop section containing the peak circuit pressure when the hydraulic pump-motor circuit is driven in a second rotational direction opposite the first rotational direction.

12. The hydrostatic transmission pressure monitoring system of claim 11, wherein the hydrostatic transmission pressure monitoring system further comprises a switching valve having a first inlet coupled to the first loop section, a second inlet coupled to the second loop section, and an outlet coupled to the first PSV.

13. The hydrostatic transmission pressure monitoring system of claim 12, wherein the switching valve contains a valve element movable between:
   a first position in which the switching valve routes a high pressure within the first loop section to the first PSV, while fluidly isolating the first PSV from the second loop section; and
   a second position in which the switching valve routes a high pressure within the second loop section to the first PSV, while fluidly isolating the first PSV from the first loop section.

14. The hydrostatic transmission pressure monitoring system of claim 5, wherein the pressure sensor data source further comprises a second PSV fluidly coupled to the pressure sensor data source, the second PSV configured to generate the pressure-scaled output signal when the hydrostatic pump-motor arrangement is driven in a second rotational direction opposite the first rotational direction.

15. The hydrostatic transmission pressure monitoring system of claim 1, wherein the pressure-scaled output signal is at least ten times less than the peak circuit pressure when the hydrostatic pump-motor arrangement is driven in a first rotational direction.

16. A hydrostatic transmission pressure monitoring system, comprising:
   a hydrostatic pump-motor arrangement including a hydraulic pump-motor circuit;
   a pressure scaling valve (PSV), comprising:
   a PSV sense port at which a peak circuit pressure of the hydraulic pump-motor circuit is received when the hydrostatic pump-motor arrangement is driven in at least a first direction; and
   a signal outlet at which a pressure-scaled output signal is generated, the pressure-scaled output signal substantially proportional to the peak circuit pressure;
   a pressure sensor in fluid communication with the signal outlet and configured to generate pressure sensor data indicative of the pressure-scaled output signal; and
   a controller in signal communication with the pressure sensor and configured to monitor the peak circuit pressure within the hydraulic pump-motor circuit utilizing the pressure sensor data.

17. The hydrostatic transmission pressure monitoring system of claim 16, wherein the PSV further comprises:
   a baseline pressure inlet at which a baseline input pressure is received; and
   a sleeve in which the baseline pressure inlet, the signal outlet, and the PSV sense port are formed; and
   a spool having a translational position within the sleeve controlling flow impedance from the baseline pressure inlet to the signal outlet, the translational position of the spool varying in conjunction with fluctuations in the peak circuit pressure received at the PSV sense port.

18. The hydrostatic transmission pressure monitoring system of claim 17, wherein the PSV further comprises:
   a pressure balance chamber fluidly coupled to the pressure-scaled output signal;
   wherein a first face of the spool is exposed to the peak circuit pressure received at the PSV sense port, the peak circuit pressure acting on the first face to urge translational movement of the spool in a first direction; and
   wherein a second face of the spool is exposed to the pressure-scaled output signal within the pressure balance chamber, the pressure-scaled output signal within the pressure balance chamber urging translational movement of the spool in a second direction opposite the first direction.

19. The hydrostatic transmission pressure monitoring system of claim 18, wherein the first face of the spool has a first cumulative effective area, while the second face of the spool has a second cumulative effective area at least twice the first cumulative effective area.

20. A work vehicle, comprising:
   a hydrostatic infinitely variable transmission (IVT), comprising:
   a hydrostatic pump-motor arrangement including a hydraulic pump-motor circuit;
   a pressure scaling valve (PSV) having a PSV sense port at which a peak circuit pressure from the hydraulic pump-motor circuit is received, having a baseline pressure inlet at which a baseline input pressure is received, and having a signal outlet at which a pressure-scaled output signal is generated; and
   a pressure sensor in fluid communication with the signal outlet and configured to generate pressure sensor data indicative of the pressure-scaled output signal; and
   a controller coupled to the pressure sensor and configured to estimate the peak circuit pressure within the hydraulic pump-motor circuit utilizing the pressure sensor data received by the controller during operation of the hydrostatic IVT.

\* \* \* \* \*